United States Patent
Savolainen

(10) Patent No.: US 11,526,417 B2
(45) Date of Patent: Dec. 13, 2022

(54) METHOD AND A SYSTEM FOR CAPACITY PLANNING

(71) Applicant: DB Pro Oy, Helsinki (FI)

(72) Inventor: Jani K. Savolainen, Helsinki (FI)

(73) Assignee: DB PRO OY, Helsinki (FI)

( * ) Notice: Subject to any disclaimer, the term of this patent is extended or adjusted under 35 U.S.C. 154(b) by 66 days.

(21) Appl. No.: 16/659,806

(22) Filed: Oct. 22, 2019

(65) Prior Publication Data

US 2020/0125469 A1 Apr. 23, 2020

(30) Foreign Application Priority Data

Oct. 23, 2018 (FI) ...................................... 20185894

(51) Int. Cl.
*G06F 11/34* (2006.01)
*G06F 9/38* (2018.01)
*G06F 11/14* (2006.01)

(52) U.S. Cl.
CPC ........ *G06F 11/3428* (2013.01); *G06F 9/3891* (2013.01); *G06F 11/1464* (2013.01); *G06F 11/3419* (2013.01); *G06F 11/3433* (2013.01)

(58) Field of Classification Search
CPC ............... G06F 11/3428; G06F 9/3891; G06F 11/1464; G06F 11/3419; G06F 11/3433
See application file for complete search history.

(56) References Cited

U.S. PATENT DOCUMENTS 7,818,408 B1 * 10/2010 Ignatuk .................. H04L 69/40
709/221
9,934,107 B1 * 4/2018 Chikkanayakanahally ................
G06F 11/1456

(Continued)

FOREIGN PATENT DOCUMENTS

WO 2016177941 A1 11/2016
WO 2017077178 A1 5/2017

OTHER PUBLICATIONS

Extended European Search Report issued by the European Patent Office in relation to European Application No. 19204006.1 dated Mar. 2, 2020 (3 pages).
Finnish Search Report issued by the Finnish Patent and Registration Office in relation to Finnish Application No. 20185894 dated Jun. 4, 2019 (2 pages).

(Continued)

*Primary Examiner* — William G Trost, IV
*Assistant Examiner* — Monishwar Mohan
(74) *Attorney, Agent, or Firm* — Robert P. Michal, Esq.; Carter, DeLuca & Farrell LLP

(57) ABSTRACT

A capacity planning method for Always On Availability Group, AG, cluster renewal includes selecting a source AG cluster to be replaced with a target AG cluster, selecting at least one performance monitor and monitoring performance of instances and databases to obtain time series. Trends of the time series are defined and at least one benchmark value is obtained for source and target nodes and calculating at least one benchmark ratio. The time series are adjusted based on the defined trends and the at least one benchmark ratio. A logical grouping of instances and databases is constituted, and workloads of the logical groups are calculated for each node on basis of the adjusted time series. A required capacity of the target AG cluster nodes is predicted. Finally, the required capacity of the target AG cluster nodes is compared to verify, whether the target node has sufficient capacity.

11 Claims, 8 Drawing Sheets

(56) References Cited

U.S. PATENT DOCUMENTS

| | | | |
|---|---|---|---|
| 2006/0074970 A1* | 4/2006 | Narayanan | G06F 11/3476 707/999.102 |
| 2008/0086480 A1* | 4/2008 | Srivastava | G06F 16/27 |
| 2011/0264748 A1* | 10/2011 | Pouzin | G06F 9/5011 709/206 |
| 2011/0307291 A1* | 12/2011 | Rolia | G06F 11/3442 705/7.12 |
| 2017/0220430 A1* | 8/2017 | Joshi | G06F 11/1662 |
| 2018/0314616 A1* | 11/2018 | Savolainen | G06F 11/3442 |
| 2018/0359336 A1* | 12/2018 | Chattopadhyay | G06F 11/2064 |
| 2019/0079682 A1* | 3/2019 | Bikumala | G06F 16/27 |

OTHER PUBLICATIONS

Finnish Office Action issued by the Finnish Patent and Registration Office in relation to Finnish Application No. 20185894 dated Oct. 6, 2020 (6 pages).

* cited by examiner

| | 0h | 1h | 2h | 3h | 4h | 5h | 6h | 7h |
|---|---|---|---|---|---|---|---|---|
| 701 | | | | | | | | |
| Node1.Instance1.AG1 | 17% | 19% | 22% | 10% | 5% | 28% | 15% | 8% |
| Node2.Instance1.AG1 | 18% | 11% | 7% | 6% | 3% | 14% | 15% | 8% |
| Capacity for AG1 | 17% | 19% | 22% | 10% | 5% | 28% | 15% | 8% |
| 702 | | | | | | | | |
| Node1.Instance1.tempdb | 1% | 3% | 5% | 2% | 4% | 3% | 5% | 2% |
| Node2.Instance1.tempdb | 2% | 3% | 1% | 3% | 1% | 2% | 1% | 1% |
| Capacity for tempdb | 1% | 3% | 5% | 2% | 4% | 3% | 5% | 2% |
| 703 | | | | | | | | |
| Node1.Instance1.userdbs | 12% | 12% | 10% | 8% | 15% | 14% | 6% | 12% |
| Capacity for userdbs | 12% | 12% | 10% | 8% | 15% | 14% | 6% | 12% |
| 704 | | | | | | | | |
| Node1.Instance2.AG2 | 3% | 6% | 4% | 2% | 6% | 8% | 5% | 3% |
| Node2.Instance2.AG2 | 7% | 9% | 8% | 7% | 4% | 4% | 8% | 2% |
| Capacity for AG2 | 7% | 9% | 8% | 7% | 6% | 8% | 8% | 3% |
| 705 | | | | | | | | |
| Node1.Instance2.tempdb.AG2 | 1% | 3% | 4% | 2% | 1% | 4% | 2% | 1% |
| Node2.Instance2.tempdb.AG2 | 2% | 4% | 2% | 4% | 2% | 2% | 1% | 2% |
| Node1.Instance2.tempdb.udb | 1% | 4% | 3% | 5% | 2% | 4% | 3% | 5% |
| Capacity for tempdb | 3% | 8% | 7% | 9% | 4% | 8% | 5% | 7% |
| 706 | | | | | | | | |
| Node1.Instance2.userdbs | 4% | 7% | 4% | 6% | 3% | 3% | 5% | 3% |
| Capacity for userdbs | 4% | 7% | 4% | 6% | 3% | 3% | 5% | 3% |
| 707 | | | | | | | | |
| Node1.Instance3.NonAG | 12% | 15% | 17% | 10% | 8% | 4% | 12% | 16% |
| Capacity for non-AG instances | 12% | 15% | 17% | 10% | 8% | 4% | 12% | 16% |
| 708 | | | | | | | | |
| Node1.Act-ActFCI1 | 3% | 2% | 3% | 3% | 4% | 5% | 3% | 5% |
| Node2.Act-ActFCI2 | 4% | 6% | 2% | 7% | 4% | 5% | 4% | 3% |
| Capacity for Act-Act FCI:s | 7% | 8% | 5% | 10% | 8% | 10% | 7% | 8% |
| 709 | | | | | | | | |
| Node1.Act-PasFCI1 | 1% | 3% | 3% | 2% | 4% | 2% | 3% | 2% |
| Capacity for Act-Pas FCI:s | 1% | 3% | 3% | 2% | 4% | 2% | 3% | 2% |
| 710 | | | | | | | | |
| Capacity of Node1 | 64% | 84% | 81% | 64% | 57% | 80% | 66% | 61% |

Figure 7

| | 0h | 1h | 2h | 3h | 4h | 5h | 6h | 7h |
|---|---|---|---|---|---|---|---|---|
| 801 | | | | | | | | |
| Node1.Instance1.AG1 | 17% | 19% | 22% | 10% | 5% | 28% | 15% | 8% |
| Node2.Instance1.AG1 | 22% | 18% | 7% | 33% | 21% | 4% | 22% | 23% |
| Capacity for AG1 | 22% | 19% | 22% | 33% | 21% | 28% | 22% | 23% |
| 802 | | | | | | | | |
| Node1.Instance1.tempdb.AG1 | 1% | 3% | 5% | 2% | 4% | 3% | 5% | 2% |
| Node2.Instance1.tempdb.AG1 | 5% | 2% | 1% | 2% | 1% | 1% | 5% | 5% |
| Node2.Instance1.tempdb.udb | 5% | 4% | 5% | 2% | 1% | 4% | 5% | 6% |
| Capacity for tempdb | 10% | 7% | 10% | 4% | 5% | 7% | 10% | 11% |
| 803 | | | | | | | | |
| Node2.Instance1.userdbs | 5% | 2% | 7% | 5% | 4% | 3% | 11% | 2% |
| Capacity for userdbs | 5% | 2% | 7% | 5% | 4% | 3% | 11% | 2% |
| 804 | | | | | | | | |
| Node1.Instance2.AG2 | 3% | 6% | 4% | 2% | 6% | 8% | 5% | 3% |
| Node2.Instance2.AG2 | 7% | 9% | 5% | 7% | 2% | 5% | 4% | 3% |
| Capacity for AG2 | 10% | 15% | 9% | 9% | 8% | 13% | 9% | 6% |
| 805 | | | | | | | | |
| Node1.Instance2.tempdb.AG2 | 1% | 3% | 4% | 2% | 1% | 4% | 2% | 1% |
| Node2.Instance2.tempdb.AG2 | 2% | 4% | 2% | 4% | 2% | 2% | 1% | 2% |
| Node2.Instance2.tempdb.udb | 3% | 4% | 5% | 2% | 4% | 3% | 5% | 2% |
| Capacity for tempdb | 6% | 11% | 11% | 8% | 7% | 9% | 8% | 5% |
| 806 | | | | | | | | |
| Node2.Instance2.userdbs | 5% | 7% | 3% | 5% | 4% | 3% | 7% | 4% |
| Capacity for userdbs | 5% | 7% | 3% | 5% | 4% | 3% | 7% | 4% |
| 807 | | | | | | | | |
| Node2.Instance3.NonAG | 9% | 7% | 5% | 4% | 3% | 12% | 5% | 5% |
| Node2.Instance4.NonAG | 6% | 7% | 3% | 5% | 11% | 1% | 2% | 6% |
| Capacity for non-AG instances | 15% | 14% | 8% | 9% | 14% | 13% | 7% | 11% |
| 808 | | | | | | | | |
| Node1.Act-ActFCI1 | 3% | 2% | 3% | 3% | 4% | 5% | 3% | 5% |
| Node2.Act-ActFCI2 | 4% | 6% | 2% | 7% | 4% | 5% | 4% | 3% |
| Capacity for Act-Act FCIs | 7% | 8% | 5% | 10% | 8% | 10% | 7% | 8% |
| 809 | | | | | | | | |
| Node1.Act-PasFCI1 | 1% | 3% | 3% | 2% | 4% | 2% | 3% | 2% |
| Capacity for Act-Pas FCIs | 1% | 3% | 3% | 2% | 4% | 2% | 3% | 2% |
| 810 | | | | | | | | |
| Capacity of Node2 | 81% | 86% | 78% | 85% | 75% | 88% | 84% | 72% |

Figure 8

METHOD AND A SYSTEM FOR CAPACITY PLANNING

CROSS-REFERENCE TO RELATED APPLICATIONS

This application claims priority to Finnish Application No. 20185894, filed Oct. 23, 2018 the entire disclosure of which is incorporated herein by reference.

FIELD

The present invention relates to a method, a system and a computer program product related to capacity planning in a computer system. More particularly, the present invention relates to capacity planning and right-sizing of SQL Server Always On High Availability Group (AG) nodes and especially to a system, method and computer program product for predicting development of capacity requirements of any number of Always On High Availability Group nodes.

BACKGROUND

Traditionally great deal of actual capacity planning for replacing the Always On High Availability Group nodes with new ones has been done manually without help of a comprehensive calculation method or automation. Manual capacity planning is a challenging, risky, inaccurate and time-consuming task.

Even if some more automated capacity planning functionality has been implemented on existing nodes, it does not provide accurate enough method for 2-n node Always On High Availability Group scenarios between the plurality of nodes in the system over time. Traditionally, workload estimates for the nodes are being planned separately on-server-basis, but that does not match the real-world usage scenarios. A real-world 2-n node scenario comprises a variety of capacity requirements, that vary over time. Capacity may be needed, for example, for dynamic Availability Group (AG) mirroring workloads, combined Failover Cluster Instance workloads, non-AG instance workloads, non-AG database workloads and possible secondary replica ad-hoc query workloads.

A traditional, on-server-basis capacity planning may easily cause situations of significant under capacity in total on resources such as host server random access memory (RAM) configuration, overall central processing unit (CPU) capacity needs, Input/output operations per second (IOPS) and such and may lead to underperformance and disaster situations.

Further, if overall capacity of source nodes is being planned into target nodes with such on-server-basis method, the method itself is not able to solve maximum potential capacity needed over time in optimal fashion per node. This is because many workloads handled by nodes and moved between nodes are dynamic from their nature.

Some types of workload may affect both nodes at the same time but on different level. Non-limiting examples of such workloads are AG workloads and Failover Cluster Instances (FCI:s). Other types of workload may affect only one node at time. Non-limiting examples of such workloads are temporary databases (tempdb), non-AG databases and non-AG instances.

In a typical use case data platform architects have been using simple and therefore inaccurate deduction like calculating existing average or peaking capacity needs in a form of a snapshot and possibly giving it some manual growth estimate over a wanted target node lifecycle and proceeding capacity planning estimate for each source node based on this type of thinking. Such a capacity planning method is problematic, and in many ways may easily end up with having insufficient overall capacity.

Another problem of the abovementioned simple capacity planning method is that it is often based on snapshot data and is not able to fit existing capacity in form of time series and therefore is more vulnerable for out of capacity situation. Because of recognizing this problem, and lack of understanding the dynamic nature of the configurations, it is relatively common for database architects to put a significant safety margin, for example 50%, into their target node capacity estimations, which makes such a method even worse. When there is a great estate of such servers, excessively bigger need for data center space, electricity consumption and running costs are likely needed—and even still, in some cases, there may be not enough capacity for some of the nodes, endangering the production environment.

DESCRIPTION OF THE RELATED ART

International patent application WO 2017/077178 A1 discloses a capacity planning method of a DBMS network, in which logical topology of a target system is defined in which distribution of source instances between target servers is harmonized.

SUMMARY

An object is to provide a method and apparatus so as to provide an improved capacity planning method, where at least one of the disadvantages is eliminated or at least alleviated. The objects of the present invention are achieved with a method, system and a computer program product according to the characterizing portion of the independent claims. The preferred embodiments of the invention are disclosed in the dependent claims.

The term replica is commonly used for nodes or servers of Always On High Availability Group. However, for clarity reasons, we prefer using terms node or server in this application. However, any of these terms may be used interchangeably.

In this context, IOPS (Input/output operations per second) refers to an input/output performance measurement used to characterize computer storage devices like hard disk drives (HDD), solid state drives (SSD), and storage area networks (SAN). Like many other benchmarks, IOPS numbers published by storage device manufacturers do not directly relate to real-world application performance.

In this context, terms node and server in refer interchangeably to a distinct physical node (server) in SQL Server Always On High Availability Group Cluster.

In this context, AG (Availability Group) refers to a software container for a set of databases, for example availability databases, that fail over together. As known in the art, failover refers to switching computing operations to a redundant or standby node.

In this context, source node refers to an old node that needs to be replaced in data platform renewal.

In this context, source system means n source nodes together in an n-node Always On High Availability Group cluster that need to be replaced in data platform renewal. Such source system may also be referred to as a source cluster.

In this context, target node refers to a new node instantiated in data platform renewal.

In this context, target system refers to a system of m target nodes together in an m-node Always On High Availability Group cluster that is instantiated in data platform renewal. Such target system may also be referred to as a target cluster.

In this context, availability database refers a database that belongs to an AG. For each availability database, the AG maintains a single read-write copy, referred to as the primary database, and one to eight read-only copies, referred to as secondary databases.

In this context, non-AG instance refers to an SQL Server instance that hasn't got any Availability Groups configured.

In this context, non-AG user database refers to an SQL Server database that is not contained in any AG on an SQL Server instance that has AG:s configured.

In this context, term replica refers to roles of databases in an Always On High Availability Group.

In this context, availability replica is an instantiation of an AG that is hosted by a specific instance of SQL Server and maintains a local copy of each availability database that belongs to the availability group. Two types of availability replicas exist: a single primary replica and one to eight secondary replicas.

In this context, a primary replica refers to an availability replica that makes the primary databases available for read-write connections with clients and, also, sends transaction log records for each primary database to every secondary replica.

In this context, a secondary replica refers to an availability replica that maintains a secondary copy of each availability database and serves as a potential failover target for the availability group. Optionally, the secondary replica can support read-only access to secondary databases and creating backups on secondary databases.

In this context, a secondary readable replica refers to the replica that has an Availability Group passively mirrored within the cluster and has AG databases in read only mode for read only/ad-hoc querying purposes. The Always On Availability Group's active secondary capabilities include support for read-only access to one or more secondary replicas (readable secondary replicas).

In this context, availability group listener refers to a node to which clients can connect in order to access a database in a primary or secondary replica of an Always On Availability Group. AG listeners direct incoming connections to the primary replica or to a read-only secondary replica.

In this context, the system databases refer to non-user databases that are located on each instance of SQL Server. Typical system databases are such as model, msdb, master and temporary databases (tempdb). Msdb databases manage for example operation of an SQL server agent.

In this context, tempdb system database refers to a global resource that is available to all users connected to the instance of SQL Server or connected to SQL Database. A tempdb is used for storage of data for intermediate processing of queries and other temporary data. For example, a tempdb may be used to hold:

temporary user objects that are explicitly created, such as:
global or local temporary tables and indexes, temporary stored procedures, table variables, tables returned in table-valued functions, and/or cursors internal objects that are created by the database engine, including, but not limited to:
work tables to store intermediate results for spools, cursors, sorts, and temporary large object (LOB) storage
work files for hash join or hash aggregate operations
intermediate sort results for operations such as creating or rebuilding indexes (if SORT_IN_TEMPDB is specified), or certain GROUP BY, ORDER BY, or UNION queries.

In this context, the Failover Cluster Instance (FCI) refers to an independent non-AG instance that can failover from one node to another.

In this context, the Active-Passive FCI refers to a model wherein first node has active instance and second node takes the workload only in failover situations when first node stops processing the FCI workload.

In this context, the Active-Active FCI means the model wherein both first node and second node have their own active instance and failover can occur in both directions; first node to second node and second node to first node. So, it is possible that both instances will run actively on same node if failover occurs.

In this context, the Dynamic Management Views (DMV) and functions return server state information that may be used to monitor the health of a server instance, diagnose problems, and tune performance.

In this context, a constraint refers to a predefined performance requirement. A constraint may be set to a measurable parameter for example as a threshold value, that may not be exceeded at any data point of a time series representing the parameter, or as a service level agreement (SLA) requirement that should be fulfilled. A data point refers to an obtained performance calculator data point representing workload calculated for a specific time period.

In this context, synchronization refers to synchronizing data between databases residing on different instances and/or on different nodes.

In this context, synchronization path refers to a connection between the databases over which data is synchronized.

The systems and methods described herein may be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer readable medium, which include storage devices and signals, in compressed or uncompressed form.

The term "computer" refers to any electronic device comprising a processor, such as a general-purpose central processing unit (CPU), a specific purpose processor or a microcontroller. A computer is capable of receiving data (an input), of performing a sequence of predetermined operations thereupon, and of producing thereby a result in the form of information or signals (an output). Depending on context, the term "computer" will mean either a processor in particular or can refer more generally to a processor in association with an assemblage of interrelated elements contained within a single case or housing.

As used herein, a "computer-readable medium" can be any means that can contain, store communicate, propagate or transport the program for use by or in connection with the instruction execution system, apparatus or device. The computer readable medium can be, for example, but not limited to, an electronic, magnetic, optical, electromagnetic, infrared or semiconductor system, apparatus, device or propagation medium. A non-exhaustive list of more specific examples of the computer-readable medium can include the following: an electrical connection having one or more wires, a portable computer diskette or memory device, a random access memory (RAM), a read-only memory (ROM), an erasable programmable read-only memory (EPROM or Flash memory), an optical fiber, and a portable compact disc read-only memory (CDROM).

The present invention is based on the idea of calculating a theoretical maximum workload for all source nodes of the source cluster and defining capacity requirements of target nodes of the target cluster on basis of the biggest of the theoretical maximum workloads calculated.

According to a first aspect, a capacity planning method for Always On Availability Group, AG, cluster renewal is provided. The method comprises selecting a source AG cluster to be replaced with a target AG cluster, selecting at least one performance monitor and monitoring performance of instances and databases of the source AG cluster with the at least one performance monitor to obtain time series. The method further comprises defining trends of the time series, obtaining at least one benchmark value for source and target nodes and calculating at least one benchmark ratio, wherein the benchmark ratio is defined for each benchmark as a ratio between a source server benchmark value and a respective target server benchmark value and adjusting said time series based on the defined trends and adjusting at least one of said time series based on the at least one benchmark ratio. The method further comprises constituting a logical grouping of instances and databases of the source AG cluster, calculating workloads of the logical groups for each node of the source AG cluster on basis of the adjusted time series and predicting a required capacity of the target AG cluster nodes on basis of calculated workloads. Finally, the method comprises comparing the required capacity of the target AG cluster nodes to at least one target node capacity to verify, whether the target node has sufficient capacity.

According to a second aspect, the logical groups comprise at least one Always On High Availability Group, AG, and at least one temporary database group, and wherein the logical groups may further comprise a user database group, a non-AG user database group, an Active-Active Failover Cluster Instances, 'FCI-instances', group, and/or an Active-Passive FCI-instances group.

According to a third aspect, the step of calculating workload comprises calculating, for each AG instance, AG workload of the AG instance, temporary database workload caused by the AG instance, and user database workload caused by the AG instance.

According to a fourth aspect, the step of calculating AG workload caused by an AG for an AG instance comprises:
if the AG of the AG instance is a primary replica and a secondary replica of the AG residing on a different node is a non-readable secondary replica, selecting AG workload of the current AG as the AG workload of the AG instance;
if the AG of the AG instance is a primary replica and the secondary replica of the AG residing on a different node is a secondary readable replica, selecting AG workload of the current AG as the AG workload of the AG instance, except if the secondary replica is a secondary readable replica that contains secondary readable databases that are configured to failover to the current AG instance, then summing both the current AG workload of the primary replica and the secondary AG workload of the secondary replica as the AG workload of the AG instance;
if the AG of the AG instance is a non-readable secondary replica, comparing the secondary replica AG workload and the respective primary AG workload on another node, and selecting the greater of these compared AG workloads as the AG workload of the AG instance; and
if the AG of the AG instance is a secondary readable replica, comparing the secondary replica AG workload and the respective primary AG workload on another node, and selecting the greater of these compared AG workloads as the AG workload of the AG instance.

According to a fifth aspect, the step of calculating temporary database workload caused by a current AG instance comprises calculating a temporary database workload of the current AG instance caused by AG workload using following calculation rules:
if the AG is a primary replica and a respective secondary replica residing on a different node is a non-readable secondary replica, using the entire temporary database workload of the current AG instance caused by AG and user database workloads as the temporary database workload of the current AG instance, and ignoring temporary database workload related to the current AG on the non-readable secondary replica;
if the AG is a primary replica and the respective secondary replica residing on a different node is a secondary readable replica, using the entire temporary database workload of the current AG instance caused by AG and user database workloads as the temporary database workload of the current AG instance, and ignoring temporary database workload related to the current AG on the non-readable secondary replica, except if the secondary readable replica contains secondary readable databases that are configured to failover to the current primary AG instance, summing up the proportional temporary database workload caused by the AG workload of the current AG instance with proportional temporary database workload caused by the respective secondary replica as the AG temporary database workload of the current AG instance, calculating a proportional temporary database workload caused by user databases on the current AG instance, and obtaining the temporary database workload of the current AG instance by summing the AG temporary database workloads and the proportional temporary database workload caused by user databases;
if the AG is a secondary non-readable replica, comparing the proportional temporary database workload caused by the AG workload of the current AG instance to a proportional temporary database workload caused by the respective primary replica, and selecting the greater of these compared temporary database workloads as the AG temporary database workload of the current AG instance, calculating a proportional temporary database workload caused by user databases on the current AG instance, and obtaining the temporary database workload of the current AG instance by summing the AG temporary database workload and the proportional temporary database workload caused by user databases;
if the AG is a secondary readable replica, comparing the proportional temporary database workload caused by the AG workload of the current AG instance to a proportional temporary database workload caused by the respective primary replica, and selecting the greater of these compared temporary database workloads as the AG temporary database workload of the current AG instance, calculating a proportional temporary database workload caused by user databases on the current AG instance, and obtaining the temporary database workload of the current AG instance by summing the proportional AG temporary database workload and the proportional temporary database workload caused by user databases.

According to a sixth aspect, said calculating workloads further comprises calculating workload of non-AG instance(s), calculating workload of Active-Active FCI(s), and/or calculating workload of Active-Passive FCI(s).

According to a seventh aspect, calculating workload of an Active-Active FCI comprises obtaining workload of an FCI instance on the current node, obtaining workload of the respective Active FCI instance on another node, and summing the obtained FCI instance workloads to obtain total Active-Active FCI workload on the current node.

According to an eighth aspect, calculating workload of an Active-Passive FCI comprises, if the current FCI instance is an active instance, obtaining workload of the FCI instance on the current node and using it as the Active-Passive FCI workload of the current node, if the current FCI instance is a passive instance, obtaining workload of the respective Active FCI instance on another node and using it as the Active-Passive FCI workload of the current node.

According to a ninth aspect, the step of comparing the required capacity comprises comparing values of data points in a time series representing the required capacity to at least one of a threshold value and a service level agreement.

According to a tenth aspect, the required capacity of target nodes equals to the maximum of the required capacities of all nodes in the target cluster, and wherein all nodes in the target cluster have similar hardware and software configurations.

According to another aspect, a computer program product is provided having instructions which, when executed by a computing device or system cause the computing device or system to perform the capacity planning method according to any of the above aspects.

According to another aspect, a computing device or system comprising memory is provided, that includes computer executable code that performs, when executed with one or more processors of the computing device or system, the capacity planning method according any of the above aspects.

According to yet another aspect, a computer program product is provided, embodied on a non-transitory computer readable medium comprising instructions stored thereon to cause one or more processors to perform the method according to any of the above aspects.

An advantage of the invention is that it is able to create an improved and more accurate capacity planning forecast for target nodes and therefore enables minimized resource overhead and provides better availability and performance for source cluster renewal in agreement with constraints, in other words, fulfilling the constraints set to the target cluster's node performance.

Another advantage of the invention is it reduces need for investment on hardware, software and/or other needed computer system resources.

Yet another advantage of the invention is that it provides expedited capacity planning lifecycle due the increased level of automation of the capacity planning.

Yet another advantage of the invention is that it enables proceeding into overall capacity planning for a plurality of nodes at once, instead of splitting capacity planning process into a plurality of individual server level plans, therefore minimizing overhead for total investment on platform renewal resources such as hardware, software, servers, data center space, electricity consumption, running costs, when these sub-projects are implemented.

Yet another advantage of the invention is that it provides a way of enabling testing and comparison of hypothetical scenarios of different hardware and virtualization setups, configurations for planned platform, such as comparing hardware requirements for target platform between different vendors and therefore optimize platform renewal costs.

BRIEF DESCRIPTION OF THE DRAWINGS

In the following the invention will be described in greater detail, in connection with preferred embodiments, with reference to the attached drawings, in which

FIG. 7 illustrates an exemplary capacity prediction calculation logic for a target node.

FIG. 8 illustrates another exemplary capacity prediction calculation logic for a target node.

DETAILED DESCRIPTION

Figure 1:
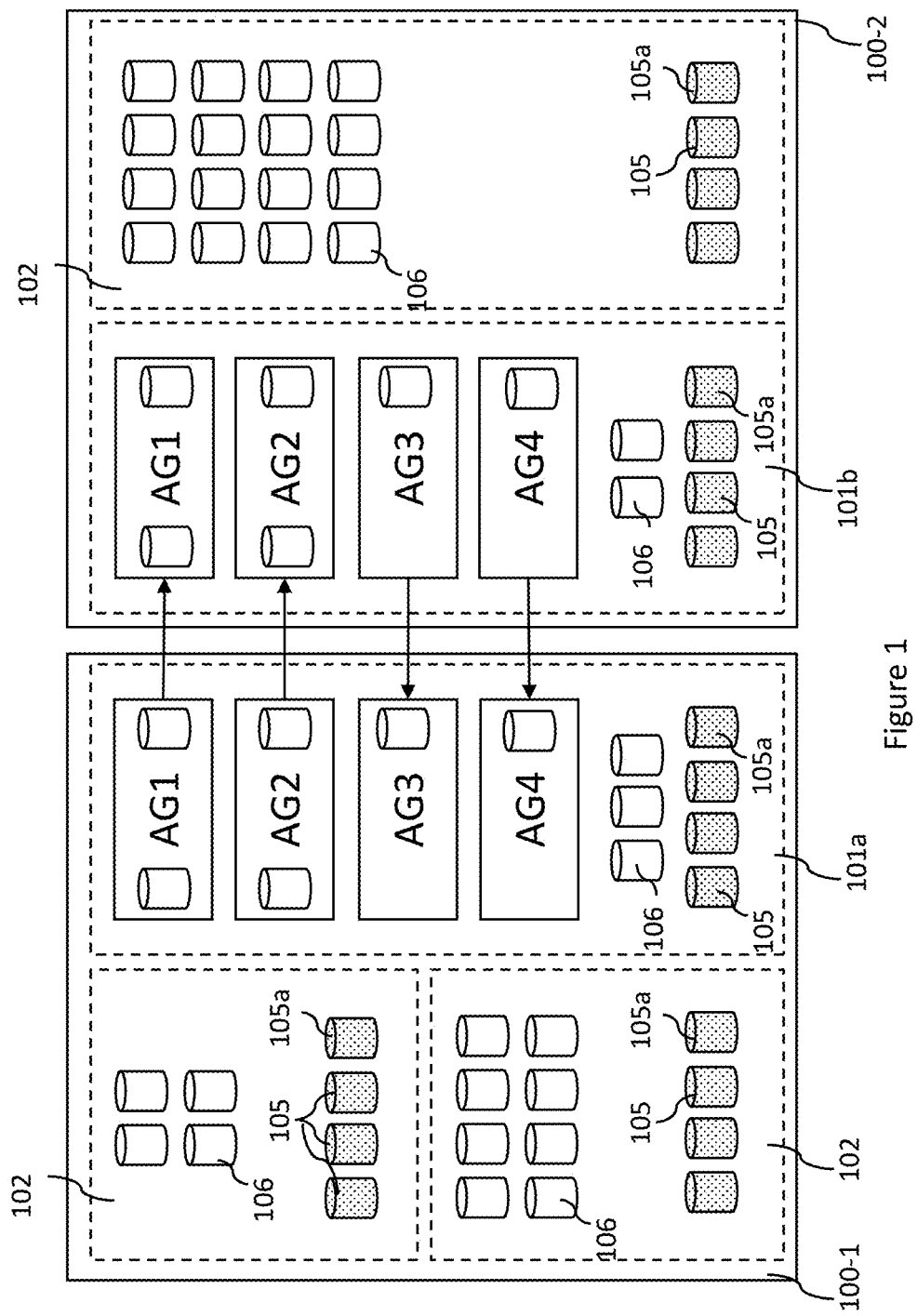
FIG. 1 is an exemplary illustration of 2-node Always On Availability Group configuration.

The systems and methods described herein may be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer readable medium, which include storage devices and signals, in compressed or uncompressed form.

The term computer refers to any electronic device comprising at least one processor, such as general-purpose central processing unit (CPU), a specific purpose processor or a microcontroller. A computer is capable of receiving data (an input), of performing a sequence of predetermined operations thereupon, an of producing thereby a result in the form of information or signals (an output). Depending on context, the term computer will mean either a processor in particular or can refer more generally to a processor in association with an assemblage of interrelated elements contained within a single case or housing.

As used herein, a computer-readable medium or storage medium can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, device or propagation medium. A non-exhaustive list of more specific examples of the computer-readable medium can include the following: an electrical connection having one or more wires, a portable computer diskette, a random access memory (RAM) a read-only memory (ROM), an erasable programmable read-only memory (EPROM or Flash memory), an optical fiber, and a portable compact read-only memory (CD-ROM).

Before an actual capacity planning prediction process can be performed, instance level performance monitors of cluster nodes, such as average CPU usage, peaking CPU usage, peaking RAM usage and total TOPS are preferably monitored for forming time series of workloads in order to catch the behavioral characteristics of workloads in the cluster nodes over time. Any kind of performance monitoring means known in the art may be used for monitoring without departing from the scope. The term peaking refers to maximum level of usage over the entire monitored time series. Time series may be created on hourly basis, but also more detailed time series may be applied, where the time periodicity is less than an hour, for example half an hour, a quarter of an hour or even less. In addition, database-level RAM consumption, TOPS and relative CPU usage on that particular instance may be monitored and/or calculated. This makes it possible forecast node-dedicated workloads of non-AG instances, FCI:s and non-AG databases as well as proportional workloads on AG databases, which is critical in order to be able to forecast the overall workloads of the nodes in total. After a monitoring period, it is possible to forecast the future capacity needs for source nodes. For non-seasonal environments, forecasting may be performed for example after few months of monitoring, and for seasonal environments, after at least one year of monitoring. This calculation method aims to so-called "worst case scenario", meaning it calculates theoretical maximum capacity needed per node for each failover scenario and therefore guarantees great availability and performance for becoming target nodes.

The FIG. 1 is a sample illustration of 2-node Always On Availability Group configuration that consists of 1 AG instance (101a, 101b) per node (100-1, 100-2). Data in each AG (AG1, AG2, AG3, AG4) is mirrored to both AG instances. Arrows between the AGs illustrates directions of failovers, in other word directions from a primary replica to a secondary replica. Either one of the nodes (100a, 100-2) may comprise the primary replica for a selected AG:s. In this example, node1 (100-1) comprises the primary replica for AG1 and AG2, whereas node2 (100-2) comprises the primary replica for AG3 and AG4. Correspondingly, node1 (100-1) comprises the secondary replica for AG3 and AG4 and node2 (100-2) comprises the secondary replica for AG1 and AG2. In this example, node1 (100-1) further has 2 non-AG instances (102) and node2 (100-2) further has 1 non-AG instance (102). AG:s (AG1, AG2, AG3, AG4) may be unreadable or readable on the respective secondary replica.

Each node also comprises at least one system database (105, 105a), and, in this example, further non-AG user databases (106) on both nodes.

System databases (105), highlighted with a pattern in the FIG. 1, comprise at least one tempdb (105a) per instance. All AG:s (AG1, AG2, AG3, AG4) cause their own calculative workload components on both nodes (100a, 100b). However, this workload may vary depending on the type of the AG on each node. Although not illustrated in this example, it would be furthermore possible to install number of Active-Active and Active-Passive FCI:s on both nodes as well.

Any Always On Availability Group configuration has a number of characteristics that should be taken into account when calculating workload requirements for each node. These characteristics include:
1) Each node preferably has equal/identical server hardware configuration with other nodes
2) There may be more than one instance on each node
3) AG workloads may change the between the nodes over time, when role of the replicas is changed between active and passive (primary vs. secondary replica)
4) Primary replica AG:s and secondary replica AG:s produce different workloads over time
5) Primary replica can synchronize AG data to multiple secondary replicas, thus causing workload to the nodes of the secondary replicas
6) Secondary replicas cannot synchronize AG data elsewhere
7) Tempdb workload on different AG instances of the different nodes may change over time
8) Tempdb workload may be split into several components in dynamic management views (DMV:s): primary AG workload, secondary AG workload, user database workload
9) Different sets of non-AG user databases may constitute workload on different instances of the different nodes over time
10) Any AG can be set as a secondary readable role in a secondary replica, which can cause extra workload on that particular secondary AG over time
11) One or more of the nodes may have instances that have no AG:s (non-AG instances)
12) AG:s have always dedicated storage on nodes (database level workload is dedicated)
13) FCI:s have always shared storage between the nodes (database level workload is shared)
14) FCI failovers whole instance (all user databases and tempdb) at once, wherein AG failovers only a selected group of user databases
15) A secondary readable replica may be configured so that in AG failover situation also the read-only workload is directed from the node with the secondary replica to the node with the primary replica.

Figure 2:
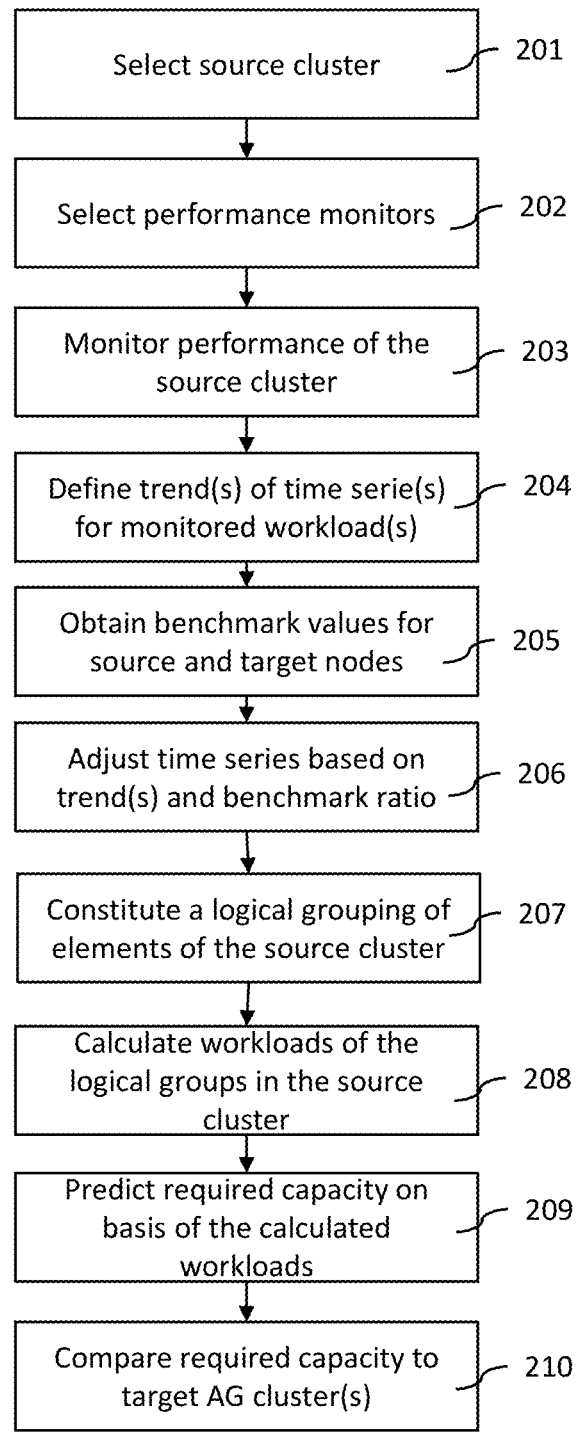
FIG. 2 is a high-level flow chart of an embodiment.

FIG. 2 illustrates a high-level flow chart of an embodiment of the invention.

In the step 201, the source cluster is selected. Since the source cluster comprises at least one AG, the source cluster may be referred to as a source AG cluster.

In the step 202, performance monitors are selected that are used for characterizing performance of the instances in the source AG cluster. Preferably, the performance monitors comprise a CPU workload monitor, for example peaking a CPU usage or average CPU usage monitor for each instance of the nodes. The performance monitors may further comprise for example a peaking RAM usage monitor and a total TOPS monitor for each instance of the nodes of the source AG cluster.

In the step 203, the performance of elements of the source cluster is monitored using the selected performance monitors for obtaining information on workloads of elements, such as the instances and databases of the source cluster, and, in particular time series of workloads. Various methods of obtaining performance metrics with performance monitors are known in the art. The performance is preferably monitored over a longer time period, and the results of the performance monitoring are preferably given as time series representing each respective performance monitor, and representative values of performance monitors are stored at each data point. We may refer to these time series as workload time series or in short time series. For example, the representative value of a data point may represent a combined result of performance monitoring over a time period. For example, a data point may represent a maximum workload of a particular element detected with a performance monitor during the respective time period, or an average workload of a particular element detected with a performance monitor during the respective time period.

In the step 204, trends of the workload time series are defined. A growth trend for each performance monitor over a desired period is defined on basis of the obtained workload time series using a best fitting trend type for each performance monitor. Trend type of the growth trend may be for example linear, exponential, power or logarithmic or the like. The desired period of the growth trend may vary, preferably 2-5 years but may also be longer or shorter.

It should be noticed that different performance monitors may have different types of trends.

In the step 205, benchmark values for the nodes in the source and target clusters are defined for CPU related performance monitors. A benchmark ratio may be calculated by comparing a benchmark value of a source node and the respective benchmark value of a planned type of target node.

For example, CPU benchmark results of a source instance host server are known, for example it may have a floating-point calculation throughput benchmark value 161. In the target server, the respective benchmark target is for example 483. In this case, the benchmark ratio is 161/483 which equals to 1/3.

In the step 206, time series are adjusted on basis on the defined trend(s) and the benchmark ratio. Adjusting may comprise for example extrapolating future growth trend and multiplying data points in time series with the benchmark ratio(s)

After defining the growth trend, for example with linear regression, future workload volume change in the workload time series data may be predicted by extrapolating.

There are two possible approaches for handling the trend calculation changes in workload time series. Either it can be predicted how the workload time series will continue over time, or it can be predicted how the existing workload time series performance monitor values must grow to match the capacity trend. In a simplified example: if a linear regression trend shows that the average workload and thus average capacity needs to grow 2-fold from existing average capacity by the end of a prediction period of 3 years, the respective workload time series members are extrapolated by the amount of linear regression curve growth to match the future capacity needs.

As an example of use of the benchmark ratio, we can use the above example of predicting future CPU needs. Using the calculated benchmark ratio of 1/3, the trend-calculated time series can be adjusted against this benchmark ratio, where in this exemplary case the workload time series member values should decrease into one third (⅓) of the extrapolated CPU values obtained using the trend.

In the step 207, a logical grouping of the elements of the source cluster is constituted. Elements of the source cluster that are used for the logical grouping comprise for example instances and databases, such as user databases and temporary databases. The selection of logical groups depends on the types of instances and databases residing on the nodes. In an AG cluster, there is at least one AG instance on each node of the cluster. Each AG instance preferably forms its own logical group. If there are more than one AG:s on same instance, each AG will constitute its own logical group.

Further, each node having at least one AG instance comprises at least one tempdb that is used at least by the at last one AG instance and thus carries workload that is dedicated to serving the at least one AG instance. Tempdb:s form another logical group or another set of logical groups. Further, instances on the nodes may have instance-specific user databases that are not part of any failover or replica arrangement. User databases, if any, preferably form their own logical group(s). Nodes may further have non-AG instances, Active-Active FCI:s and Active-Passive FCI:s, which preferably form their respective logical groups.

In the step 208, the monitored performance data is analyzed, workloads are calculated, and the calculated workloads are assigned to the logical groups as time series.

In the step 209, required capacity of each target cluster node is predicted on basis of the calculated workloads of the logical groups. A required capacity for any selected parameter may be predicted on basis of the predicted theoretical maximum of capacity requirement of the target node with highest theoretical calculated workload for any one of the target nodes. When SLAs are used for calculation, minimum required capacity is defined on basis of the performance of the node with poorest SLA at any data point.

In the step 210, the predicted capacity requirement is compared to capacity of the target nodes in the target cluster. All target nodes have preferably the same hardware and software configuration that fulfills the capacity requirement criteria used. In other words, all target cluster nodes should fulfill the same predicted capacity requirement. Capacity requirement criteria may be expressed as constraints given to each parameter evaluated.

The predicted capacity time series may be evaluated either based on single time series member threshold value or based on a service level agreement (SLA)-type constraint value. If the evaluation is done against a threshold value, it is preferable to check that none of the average CPU percentage performance monitors' adjusted capacity requirement time series members will ever exceed a set threshold value (such as 80%). Evaluation may be performed for example instance by instance. If the workload predicted on basis of the current source instance fits under a current target node, it may be tested whether the predicted workload of next source instance will still fit on that same target node. If the time series has been given an SLA-based constraint value, such as "average CPU should not exceed 80% limit more than 1 time out of 1000 in whole time series", then this comparison is performed for all adjusted total CPU capacity requirement time series member values. Similar evaluation is performed for all desired capacity requirements of the source node that are to be handled by the target node.

Then, based on before mentioned criteria, if all the combined AG, FCI, non-AG instance, tempdb and non-AG database workloads (predicted capacity requirement) fit in a target node in all of the known cases over time, and fulfill all constraints given, the desired target server has sufficient capacity on that particular node. Note that all target nodes in the same target cluster should fulfill the same conditions. This can be ensured for example by defining all target nodes in the target system to have equal hardware and software configurations and using the maximum of the node-level predicted workloads for the evaluation.

The process may be iterated through a plurality, or even through all desired server, CPU and/or RAM combinations on target node to find out the optimal target node configuration on target platform based on above-mentioned criteria.

Figure 3:
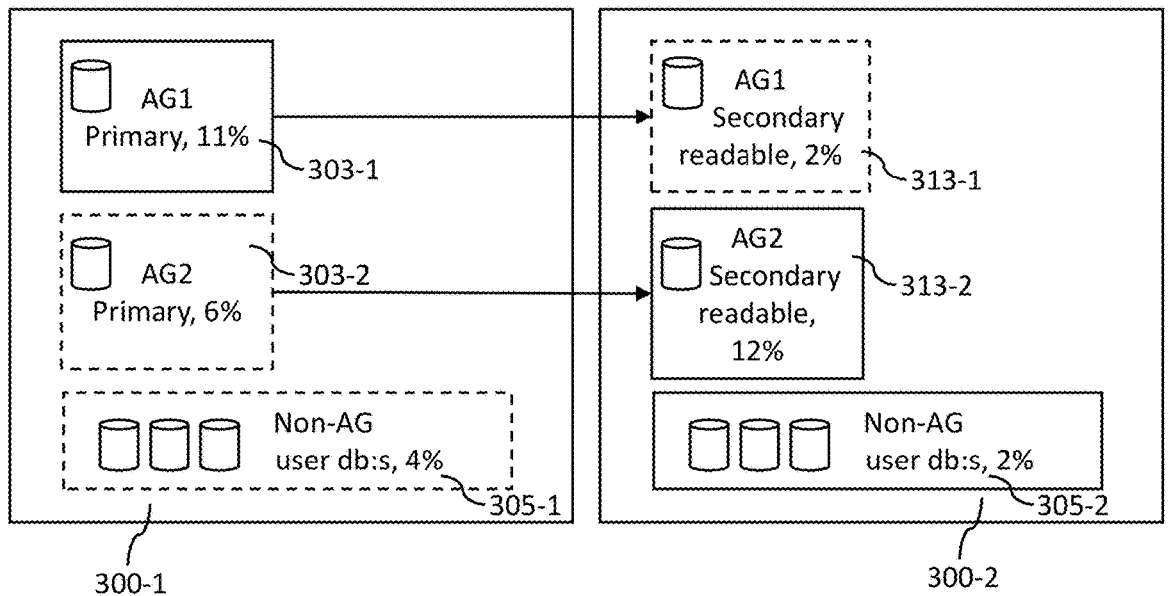
FIG. 3 illustrates an example of workload calculation for a node in a 2-node cluster.

FIG. 3 illustrates a simplified example of workload calculation in a 2-node cluster that has 2 AG:s (AG1, AG2) that are synchronized from a first node (node1, 300-1) that has two primary AG:s (303-1, 303-2) to second node (node2, 300-2), that has two secondary readable AGs (313-1, 313-2). Arrows between the AGs illustrates directions of failovers, in other word directions from a primary replica to a secondary replica. A secondary readable AG may experience significant workload when it provides responses to queries or maintains a backup of the primary AG. For simplicity, only main elements residing in the AG:s relevant to calculation of workload are shown. Total workload of node2 (300-2) is the sum of biggest AG workloads summed up together with user database (305-2) workload on the node2 (300-2). User database (305-1) workload of node1 (300-1) is not relevant for node2 (300-2) workload calculations. Workload may be expressed as proportional workload, which expresses a percentage of the workload in comparison to maximum capacity of the node for the respective parameter. Percentage can be conveniently used to express workload and to compare workloads between nodes, when the nodes have mutually equal hardware configurations.

In the FIG. 3, workloads that are selected for workload calculations are marked with solid outline, while workloads that are not selected are marked with a dashed outline. In this example, workload of the primary AG1 (303-1) at the node1 (300-1) is 11%, while on the node2 (300-2) the secondary readable AG1 workload is only 2%. Thus, workload of AG1 (303-1) on the instance1 (300-1) is selected to be included in workload calculations of node1 (300-1), which is also indicated in the figure with solid outline of AG1 (303-1) on node1 (300-1). Workload of the primary AG2 (303-2) at the node1 (300-1) is 6%, while at the node2 (300-2) the secondary readable AG2 workload is 12%. The user database workload at the node2 (300-2) is 2%. User database (305-1) workload of node1 (300-1) is not relevant for node2 (300-2) workload calculations. Thus, the total workload of the node2 (300-2) can be calculated the sum of the bigger AG workloads (11%+12%) plus the user database workload 2% of the node2, which gives a total workload of 11%+12%+2%=25%.

AG instance tempdb workload calculation is performed by calculating first AG-related proportional tempdb workload on a current node for secondary AG:s and compare this value with all the connected primary replica AG workloads together for the current node. Then the one of these workloads that is bigger is selected for each failover scenario and that value is added to the user database driven tempdb workload and primary AG workload on the current node. If a secondary readable AG is configured to failover to a primary replica at a node then both secondary and primary AG workloads as well as the related tempdb workloads from both nodes need to be included into the workload calculations of the node.

Calculation of tempdb proportional workload needs to take into account any tempdb workload that is bound to user databases in all the AG:s on the current instance. For example, if 75% of the tempdb peaking CPU workload is dedicated AG user database-driven, only 75% of the tempdb workload is counted in that particular performance monitor at any given time. Even though taking the proportional workload into account somewhat complicates calculation of tempdb workload out from the DMV:s of tempdb, this improves the accuracy of the node level capacity calculation by reflecting the AG user database-driven capacity needs and thus slightly increasing the overall workload.

Figure 4:
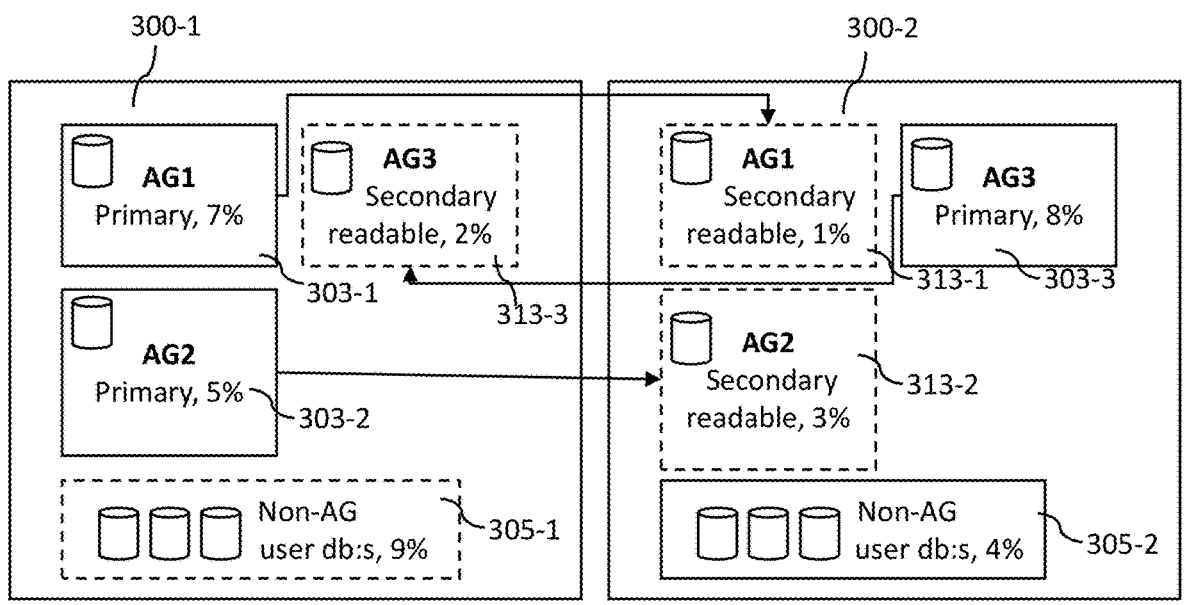
FIG. 4 illustrates an example of AG instance tempdb calculation logic for a node in a 2-node cluster.

FIG. 4 illustrates an example of AG instance tempdb workload calculation logic for a node2 (300-2) having 2 secondary AG:s (313-1, 313-2) and one primary AG (303-3) with peaking CPU utilization. For simplicity, only elements residing in the AG's relevant to calculation of AG workload are shown. Arrows between the AGs illustrates directions of failovers, in other word directions from a primary replica to a secondary replica. Similar to FIG. 3, workloads that are selected for workload calculations are marked with solid outline, while workloads that are not selected are marked with a dashed outline. First, AG1 (303-1)+AG2 (303-2) tempdb workloads are calculated on the node1 (300-1) because those workloads failover to node2 (300-2). Then the AG1 (313-1)+AG2 (313-2) tempdb workloads on the node2 (300-2) are calculated. The total summed AG tempdb workloads are compared and the bigger one is selected and added up to the proportional user database workload and proportional primary AG workload on node2 (300-2). Percentage can be used to express workload and compare workload between nodes, when the nodes have mutually equal hardware configurations. The result for node1 (300-1) proportional AG workloads ("failover workload") is: 7%+5%=12%. The result for node2 (300-2) proportional AG workloads is: 1%+3%=4%. Comparing the total workloads we can see that node1 (300-1) failover AG workload in terms of tempdb usage is bigger than total of node2 (300-2). Thus, the total workload for node2 can be calculated by summing proportional node1 (300-1) primary AG workload 12%+node2 (300-2) proportional primary AG workload 8%+proportional user database workload 4%=total of 12%+8%+4%=24% peaking CPU utilization workload in total on that particular node2 (300-2).

If the node being evaluated has a primary replica and the AG has a respective secondary readable replica, if the AG failover is configured to redirect the read-only workload to the primary replica, the AG user databases workload for each data point on both replicas is always selected and summed for each performance monitor. If the node being evaluated carries a secondary replica, the bigger one of the AG user database workloads at the primary and the secondary replica should be selected for the respective performance monitor for each data point for the node.

If the node being evaluated has the primary replica, and the AG has a secondary readable replica, and if the AG failover is configured not to redirect the read-only workload to the primary replica, the workload of the primary replica is selected for each performance monitor at each data point. If the node being evaluated has the secondary replica, the bigger one of the AG user database workloads at the primary and secondary replica for each data point should be selected for the respective performance monitor.

For Active-Passive FCI:s, workload on the active node is selected for each data point and summed up for the node being evaluated (Active or Passive node). Active-Passive FCI performance monitor may comprise workload of the Active FCI over the respective calculation time periods.

For Active-Active FCI:s, workload for each data point on both active nodes is selected and summed up for both nodes. Active-Active FCI performance monitor may comprise the summed up workload of the Active FCI:s of the nodes over time.

For non-AG instances, workload for each data point on the current node is selected. Non-AG instance performance monitor may comprise the workload of that particular Non-AG instance over time.

For non-AG user databases, workload for each data point on the current node should be selected. Non-AG user databases performance monitor may comprise the proportional workload of the non-AG user databases of that particular AG instance over time.

For obtaining a theoretical maximum workload for the particular current node, results of all relevant ones of the above mentioned sub-calculations are summed.

If the system comprises more than two nodes, all possible data synchronization paths and failover scenarios need to be taken into account for each node to understand which AG workloads should be compared for each node.

Figure 5:
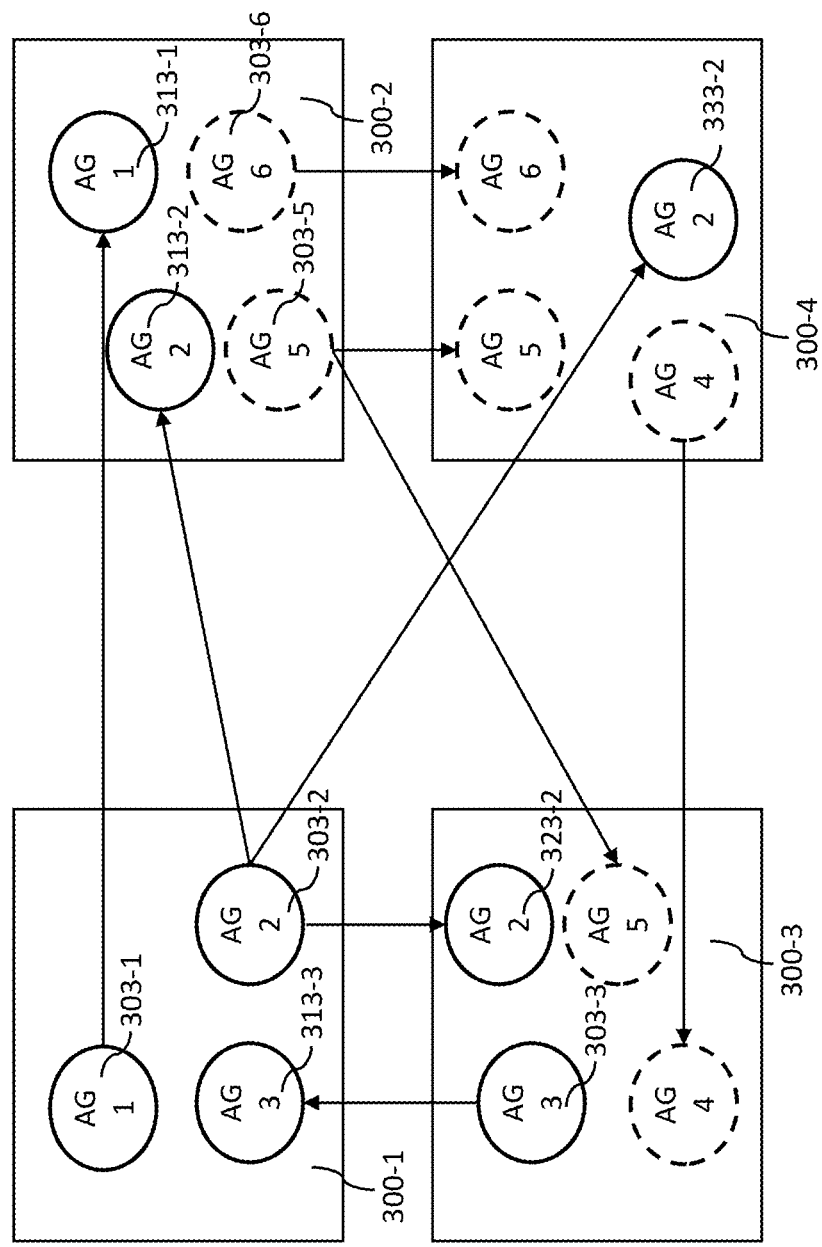
FIG. 5 illustrates an example of a 4-node cluster.

FIG. 5 illustrates an example of a 4-node cluster in which four nodes (300-1, 300-2, 300-3, 300-4) have multiple AGs. As can be seen from the FIG. 5, different AG:s with varying number and direction of synchronization paths are disposed on the four nodes. Node1 (300-1) comprises three AGs, AG1 (303-1), AG2 (303-2) and AG3 (313-3), each of which is paired with AGs in at least one of the other nodes (300-2, 300-3, 300-4). When workload observations are done for node1 (300-1), AGs (303-1, 303-2, 313-3) on the node1 (300-1) and workloads due to respective AGs (313-1; 303-3, 323-2; 333-2) on other three nodes (300-2, 300-3, 301,4) are to be compared over time. Workloads related to other AGs marked with dashed line (AG4, AG5, AG6) are not relevant for analyzing workloads of node1. As can be seen, the count of nodes and AG synchronization paths for each AG does not change the calculation logic, independent of whether the selected node carries one or more primary and/or secondary replicas. Thus, increasing the number of nodes only adds up more parallel workloads from the other nodes to be compared with workloads of the selected node.

For example, if workload observations were made for node2 (300-2), workloads related to the four AGs (313-1, 313-2, 303-5, 303-6) disposed on the node2 as well as their counterparts on other three nodes would be selected for analysis instead. Thus, workloads related to AG1, AG2, AG5 and AG6 would be included, while fore example workloads related to AG3 and AG4 would be excluded.

Figure 6:
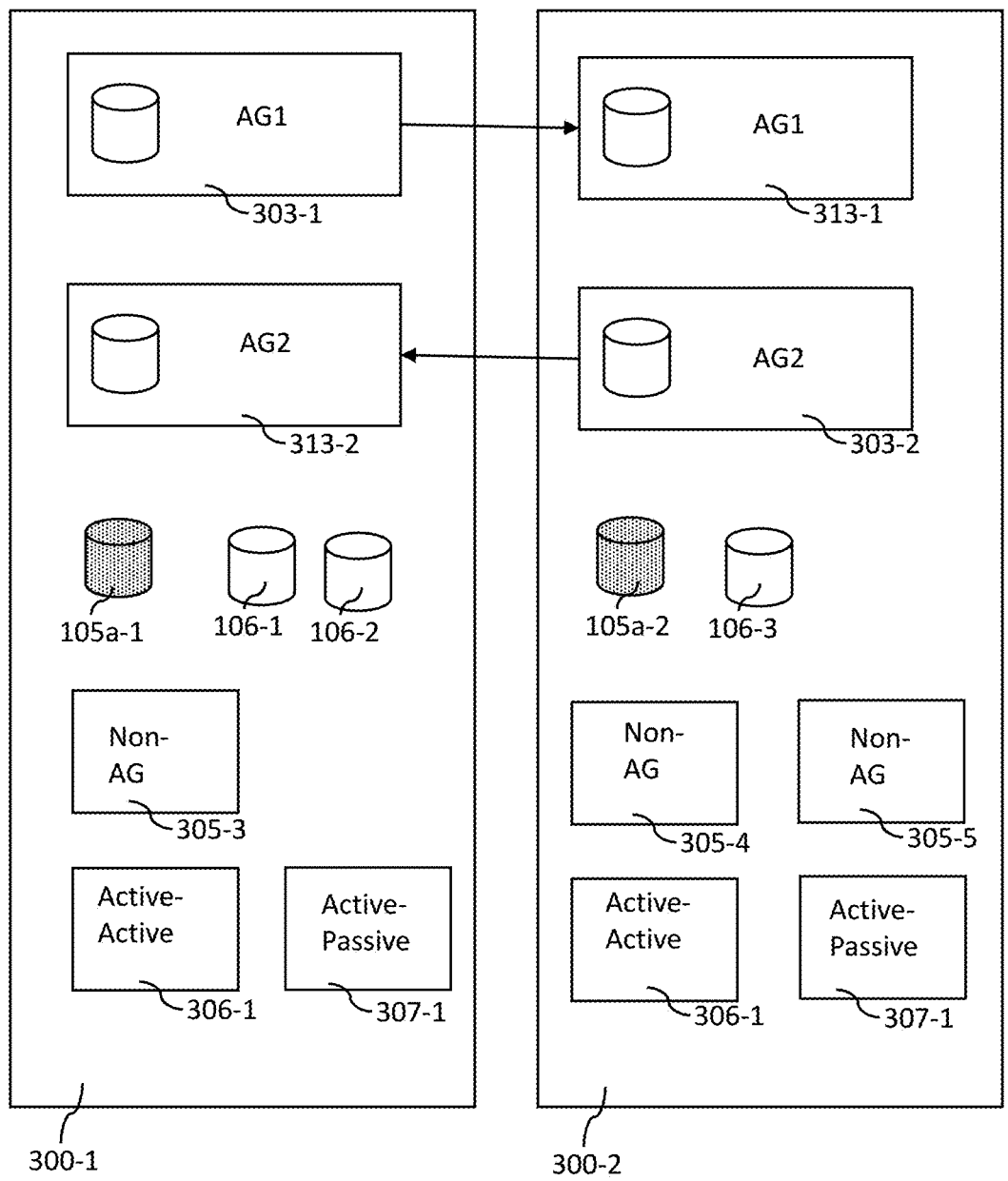
FIG. 6 illustrates an exemplary 2-node cluster.

FIG. 6 illustrates an exemplary 2-node AG cluster. The system comprises two nodes (300-1, 300-2). Node1 (300-1) is configured to carry the primary replica for AG1 (303-1), while node2 (300-2) carries the secondary non-readable replica for the AG1 (313-1). Node2 (300-2) is configured to carry the primary replica for AG2 (303-2), while node1 (300-1) carries the secondary readable replica for the AG2 (313-2). AG2 is configured to failover read-only workload from the secondary replica on node1 (300-2) to node2 (300-1). Both nodes have a dedicated tempdb (105a-1, 105a-2) and one or more dedicated non-AG user databases (106-1, 106-2, 106-3). In addition to that node1 (300-1) comprises one non-AG instance (305-3), one Active-Active instance (306-1) and one Active-Passive instance (306-2) in Active role at the time being. Node2 (300-2) comprises two non-AG instances (305-4, 305-5), one Active-Active instance (306-1) and one Active-Passive instance (306-2) in passive role at the time being.

FIG. 7 illustrates an exemplary capacity prediction calculation logic for a target node1 (300-1), in the 2-node system of the FIG. 6 having two nodes, node1 (300-1) and node2 (300-2). The prediction is based on performance monitors for peaking CPU utilization percentages of respective two source nodes in a source cluster, having equal hardware configuration. Before prediction of required capacity of the target cluster is performed, time series initially obtained from the source cluster have already been adjusted for the intended target cluster. Similar required capacity calculation can be performed for any selected type of capacity. Predicted capacity requirements caused by each different type of workload are shown as a time series of data points on hourly basis. Data points highlighted with gray background represent workload/required capacity data points that are selected to be used in the required capacity prediction calculation in each step. Decision logic for making the selection of applicable data points is referred to in connection of the following method steps. The selected data point value for the time series for each logical group is marked on the bottom line of each logical group, that has been underlined. Term workload in this example refers to data points in the adjusted workload time series that are used for the required capacity prediction.

701) Workload from node1.instance1.AG1 (303-1) is obtained and used as the AG workload for the current AG, AG1. Workload from node2.instance1.AG1 (313-1) is neglected from the calculation, because that is a secondary replica, in particular a non-readable secondary replica, and its workload cannot be failed over to the current, primary replica node1.instance1.AG1.

702) Tempdb workload, in other words the tempdb workload related to node1.instance1 is obtained. Tempdb workload of node2.instance1.AG1 is neglected because that is a secondary replica, in particular a non-readable secondary replica. Furthermore, while there are no AG:s in this cluster that could failover to instance1, there is no need to calculate proportional tempdb workloads for instance1, but the entire tempdb workload caused by AG1 and the workload related user database(s) may be used as such as the tempdb workload of instance 1.

703) Non-AG user database workloads of node1.instance1 (303-1) are obtained and summed up.

704) Workloads of node1 and node2 on instance2.AG2 (313-2, 303-2) are obtained and compared, because AG2 contains secondary readable databases that are configured to failover from a secondary readable replica at node1 to a primary replica at node2 and we want to find out which replica generates the biggest workload at each time. Bigger one of the two workloads at each time point is selected as the data point of this workload.

705) Workloads of node1 and node2 on instance2 tempdb (105a-1, 105a-2) are obtained and compared for their AG2 workload footprint, and the biggest one is selected for workload calculation. User database-driven tempdb workload from node1 is added up to the selected AG2 tempdb workload to obtain total tempdb workload at node1.

706) Non-AG user database workloads on node1.instance2 (313-2) are obtained and summed up.

707) Total non-AG instance workload on node1 is summed up. In this example, this equals workload of node1.instance3 (305-3), which is the only non-AG instance on that particular node, so that the non-AG instance workload on each data point equals to the single instance workload.

708) Active-Active FCI (306-1) workloads from both nodes are obtained and summed up.

709) Active-Passive FCI Active node (307-1) workload capacity calculations on the current node, node1 (300-1), are obtained and included into node1 workload calculation.

710) All the subtotals obtained in the phases 701-709 are obtained and summed up at each data point for obtaining a node level workload calculation result, that reflects total predicted capacity needs of the node1 (300-1).

FIG. 8 illustrates an exemplary required capacity prediction calculation logic for target node2 (300-2), in the same 2-node cluster of the FIG. 6. The prediction is based on performance monitors for peaking CPU utilization percentages of respective two source nodes in a source cluster, having equal hardware configuration. Before prediction of required capacity is performed, time series initially obtained from the source cluster have already been adjusted for the intended target cluster. Similar required capacity calculation can be performed for any selected type of capacity. Predicted capacity requirements caused by each different type of workload are shown as a time series of data points on hourly basis. Data points highlighted with gray background represent workload/required capacity data points that are selected to be used in the required capacity prediction calculation in each step. Decision logic for making the selection of applicable data points is referred to in connection of the following method steps. The selected data point value for the workload time series for each logical group is marked on the bottom line of each logical group, that has been underlined. Term workload in this example refers to data points in the adjusted workload time series that are used for the required capacity prediction.

801) Workloads from node2.instance1.AG1 (313-1) and node1.instance1.AG1 (303-1) are compared and bigger one of these is selected because the current node, node2, we are dealing with is secondary, non-readable replica.

802) Proportional AG workload from node1.instance1.AG1 portion of tempdb (105a-1) is obtained and compared with proportional AG workload from node2.instance1.AG1 tempdb (105a-2) because we are dealing with secondary, non-readable replica. Bigger one of the proportional AG workloads is summed with workload of user tempdb workload from user database of AG instance 1 to obtain total tempdb workload for instance 1.

803) The non-AG user database workloads on node2.instance1 (313-1) are obtained are summed up.

804) Workloads of node1 and node2 on instance2.AG2 (313-1, 303-2) are obtained and summed up, because AG2 contains secondary readable databases that are configured to failover from secondary readable replica on node1 to primary replica on node2.

805) Workloads of node1 and node2 on instance2 tempdb for their AG2 footprint, in other words the portion of the tempdb workload caused by AG2, are obtained and summed up and added up the proportional user database bound workload because secondary readable workload may failover to primary replica.

806) Non-AG user database workloads on node2.instance2 (303-2) are obtained and summed up.

807) Total non-AG instance workload on node2 is obtained and calculated by summing up the obtained non-AG instance workloads (node2.instance3 (305-4)+ node2.instance4 (305-5)), since there are two non-AG instances on that particular node.

808) Active-Active FCI (306-1) workloads from both nodes are obtained and summed up.

809) Active-Passive FCI Active node, node1 (300-1) workload is obtained and included into current node2 capacity calculations.

810) All the subtotals from calculations 801-809 are summed up at each data point to obtain a node level capacity calculation result that reflects workload and thus capacity needs of the node2 (300-2).

FIGS. 7 and 8 also illustrate logical grouping of instances and workloads. Instances are logically grouped into AG, non-AG instances, and workloads are logically grouped into AG, non-AG, tempdb, user database, Active-Active FCI and Active-Passive FCI workloads.

Figure 9:
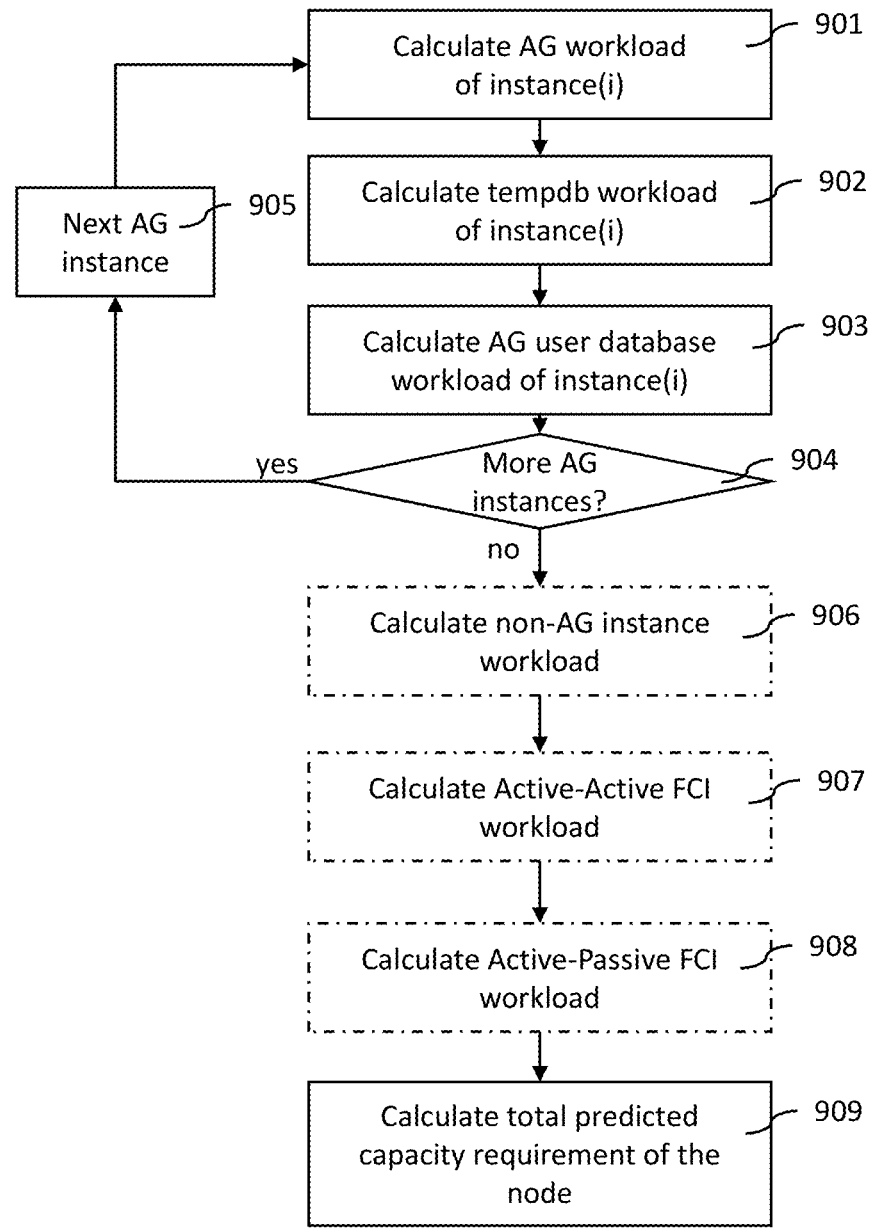
FIG. 9 is a flow chart illustrating main steps of a method for calculating node level capacity requirement prediction.

FIG. 9 is a flow chart illustrating main steps of the method for calculating node level capacity requirement prediction shown in connection with FIGS. 7 and 8.

In the step 901, AG instance workload of the current instance of the current target node is calculated. Calculation depends on the nature of the AG instances on the current node and on other nodes in the cluster. Examples of AG instance workload calculation options and calculation criteria are disclosed in relation to steps 1) and 4) of FIGS. 7 and 8.

In the step 902, tempdb workload for the current instance is calculated. Calculation depends on the nature of the tempdbs on the current and other nodes. Examples of tempdb wokload calculations and calculation criteria are disclosed in relation to steps 2) and 5) of FIGS. 7 and 8.

In the step 903, user database workload for the current instance is calculated.

Steps 901, 902 and 903 are repeated to all AGs on the current instance, as illustrated with the decision step 904 and the increment step 905. However, it is not necessary to perform these calculations sequentially, but also parallel calculation is possible, or any combination of these.

In the step 906, non-AG workload is calculated for the current node. Examples of calculation of non-AG capacity are given in step 7) in relation to FIGS. 7 and 8.

In the step 907, workload for Active-Active FCIs is calculated for the current node. Examples of calculation of Active-Active FCI workload are given in step 8) in relation to FIGS. 7 and 8.

In the step 908, workload for Active-Passive FCIs is calculated for the current node. Examples of calculation of Active-Passive FCI capacity are given in step 9) in relation to FIGS. 7 and 8.

Finally, in the step 909, total predicted capacity requirement for the target node, in other words maximum total predicted workload caused by all instances and databases that may at any point of time be instantiated on the current target node, is calculated by summing all workloads received as result of steps 901-908. When proportional workloads are used for the calculation, the predicted capacity requirement indicates the maximum proportional workload that could occur on the target node when handling all tasks that could be instantiated on it. The highest peak of each predicted capacity needs/workloads from each node is identified and these predicted capacity need/workload peaks are summed up into one entity, the total predicted capacity, that defines the capacity needs for each target node.

Although the calculation steps have been shown above in a particular order, the order of the steps independent of each other may be changed. Steps may also be performed in parallel with each other. Workload calculations are performed on basis of obtaining performance monitors for each relevant element. Capacity calculations may be performed at the end of an observation time period, or after a plurality of observation periods. Total workload is, however, dependent on all other workload calculations, and it may therefore only be calculated after all respective workload calculations for a particular time period have been performed. One or more of the calculation steps may be optional, depending whether the current node has such resources instantiated or not. Optionality is illustrated with dot-dash outline of steps 906, 907 and 908. If the node does not have non-AG instances, Active-Active FCI or Active-Passive FCI, these steps may be omitted.

It is apparent to a person skilled in the art that as technology advanced, the basic idea of the invention can be implemented in various ways. The invention and its embodiments are therefore not restricted to the above examples, but they may vary within the scope of the claims.

The invention claimed is:

1. A computer-implemented capacity planning method for Always On Availability Group ("AG"), cluster data platform renewal, the method comprising:
   selecting a source AG cluster with a predetermined failover configuration to be replaced with a target AG cluster with the same predetermined failover configuration, wherein all target AG cluster nodes have mutually similar configurations;
   selecting a plurality of performance monitors;
   monitoring performance of instances and databases of the source AG cluster with each of the plurality of performance monitors to obtain time series;
   defining trends of the time series;
      obtaining at least one benchmark value for the plurality of performance monitors for source nodes in the source AG cluster and target nodes in the target AG cluster and calculating at least one benchmark ratio, wherein the benchmark ratio is defined for each benchmark as a ratio between a source node benchmark value and a respective target node benchmark value;
      adjusting said time series based on the defined trends and adjusting at least one of said time series based on the at least one benchmark ratio;
      constituting a logical grouping of all instances and databases of the source AG cluster for forming logical groups comprising at least one Always On High Availability Group (AG) and at least one temporary database group, and wherein the logical groups may further comprise a user database group, a non-AG user database group, an Active-Active Failover Cluster Instances (FCI-instances) group, and/or an Active-Passive FCI-instances group;
      calculating workloads of said logical groups for each node of the source AG cluster on basis of the adjusted time series, and calculating, for each node, a maximum total predicted workload with respect to each of the plurality of performance monitors caused by all instances and databases of the respective node of the source AG cluster and databases in any other nodes of the source AG cluster that may at any point of time be instantiated on the node based on the predetermined failover configuration by summing workloads of the respective logical groups;
      predicting a required capacity of the target AG cluster nodes with respect to selected parameters associated with the plurality of performance monitors on basis of calculated workloads, wherein the required capacity of each selected parameter is obtained on basis of predicted maximum of the respective capacity requirement among all nodes in the AG cluster; and
      comparing the required capacity of the target AG cluster nodes to at least one target node capacity to verify, whether the target node has sufficient capacity for all selected parameters.

2. The capacity planning method of claim 1, wherein the step of calculating workload comprises, for each AG instance:
   calculating AG workload of the AG instance;
   calculating temporary database workload caused by the AG instance; and
   calculating user database workload caused by the AG instance.

3. The capacity planning method of claim 2, wherein the step of calculating AG workload caused by an AG for an AG instance comprises:
   if the AG of the AG instance is a primary replica and a secondary replica of the AG residing on a different node is a non-readable secondary replica, selecting AG workload of the current AG as the AG workload of the AG instance;
   if the AG of the AG instance is a primary replica and the secondary replica of the AG residing on a different node is a secondary readable replica, selecting AG workload of the current AG as the AG workload of the AG instance, except if the secondary replica is a secondary readable replica that contains secondary readable databases that are configured to failover to the current AG instance, then summing both the current AG workload of the primary replica and the secondary AG workload of the secondary replica as the AG workload of the AG instance;
   if the AG of the AG instance is a non-readable secondary replica, comparing the secondary replica AG workload and the respective primary AG workload on another node, and selecting the greater of these compared AG workloads as the AG workload of the AG instance; and
   if the AG of the AG instance is a secondary readable replica, comparing the secondary replica AG workload and the respective primary AG workload on another node, and selecting the greater of these compared AG workloads as the AG workload of the AG instance.

4. The capacity planning method of claim 2, wherein the step of calculating temporary database workload caused by a current AG instance comprises:
   calculating a temporary database workload of the current AG instance caused by AG workload, wherein:
      if the AG is a primary replica and a respective secondary replica residing on a different node is a non-readable secondary replica,
         using the entire temporary database workload of the current AG instance caused by AG and user database workloads as the temporary database workload of the current AG instance, and ignoring temporary database workload related to the current AG on the non-readable secondary replica;
      if the AG is a primary replica and the respective secondary replica residing on a different node is a secondary readable replica,
         using the entire temporary database workload of the current AG instance caused by AG and user database workloads as the temporary database workload of the current AG instance, and ignoring temporary database workload related to the current AG on the non-readable secondary replica, except if the secondary readable replica contains secondary readable databases that are configured to failover to the current primary AG instance, then
            summing up the proportional temporary database workload caused by the AG workload of the current AG instance with proportional temporary database workload caused by the respective secondary replica as the AG temporary database workload of the current AG instance,
         calculating a proportional temporary database workload caused by user databases on the current AG instance, and
         obtaining the temporary database workload of the current AG instance by summing the AG temporary database workloads and the proportional temporary database workload caused by user databases;

if the AG is a secondary non-readable replica,
  comparing the proportional temporary database workload caused by the AG workload of the current AG instance to a proportional temporary database workload caused by the respective primary replica, and selecting the greater of these compared temporary database workloads as the AG temporary database workload of the current AG instance,
  calculating a proportional temporary database workload caused by user databases on the current AG instance, and
  obtaining the temporary database workload of the current AG instance by summing the AG temporary database workload and the proportional temporary database workload caused by user databases; and if the AG is a secondary readable replica,
  comparing the proportional temporary database workload caused by the AG workload of the current AG instance to a proportional temporary database workload caused by the respective primary replica, and selecting the greater of these compared temporary database workloads as the AG temporary database workload of the current AG instance,
  calculating a proportional temporary database workload caused by user databases on the current AG instance, and
  obtaining the temporary database workload of the current AG instance by summing the proportional AG temporary database workload and the proportional temporary database workload caused by user databases.

5. The capacity planning method of claim 1, wherein the step of calculating workloads further comprises:
  calculating workload of non-AG instance(s);
  calculating workload of Active-Active FCI(s); and/or
  calculating workload of Active-Passive FCI(s).

6. The capacity planning method of claim 5, wherein calculating workload of an Active-Active FCI comprises:
  obtaining workload of an FCI instance on the current node;
  obtaining workload of the respective Active FCI instance on another node; and
  summing the obtained FCI instance workloads to obtain total Active-Active FCI workload on the current node.

7. The capacity planning method of claim 5, wherein calculating workload of an Active-Passive FCI comprises:
  if the current FCI instance is an active instance, obtaining workload of the FCI instance on the current node and using it as the Active-Passive FCI workload of the current node; and
  if the current FCI instance is a passive instance, obtaining workload of the respective Active FCI instance on another node and using it as the Active-Passive FCI workload of the current node.

8. The method according to claim 1, wherein the step of comparing the required capacity comprises comparing values of data points in a time series representing the required capacity to at least one of a threshold value and a service level agreement.

9. The method according to claim 1, wherein the required capacity of target nodes equals to the maximum of the required capacities of all nodes in the target AG cluster, and wherein all nodes in the target AG cluster have similar hardware and software configurations.

10. A computer executable code stored on a non-tangible computer readable medium, the computer program having instructions which, when executed by a computing device or system cause the computing device or system to perform the capacity planning method according to claim 1.

11. A computing device or system comprising memory that includes computer executable code that performs, when executed with one or more processors of the computing device or system, the capacity planning method according to claim 1.

* * * * *